Aug. 20, 1935. M. E. PERRIER 2,012,020
CARBURETOR FOR INTERNAL COMBUSTION ENGINES
Filed Aug. 18, 1932 2 Sheets-Sheet 1

Inventor:
Michel Eugène Perrier
By [signature]
Attorney

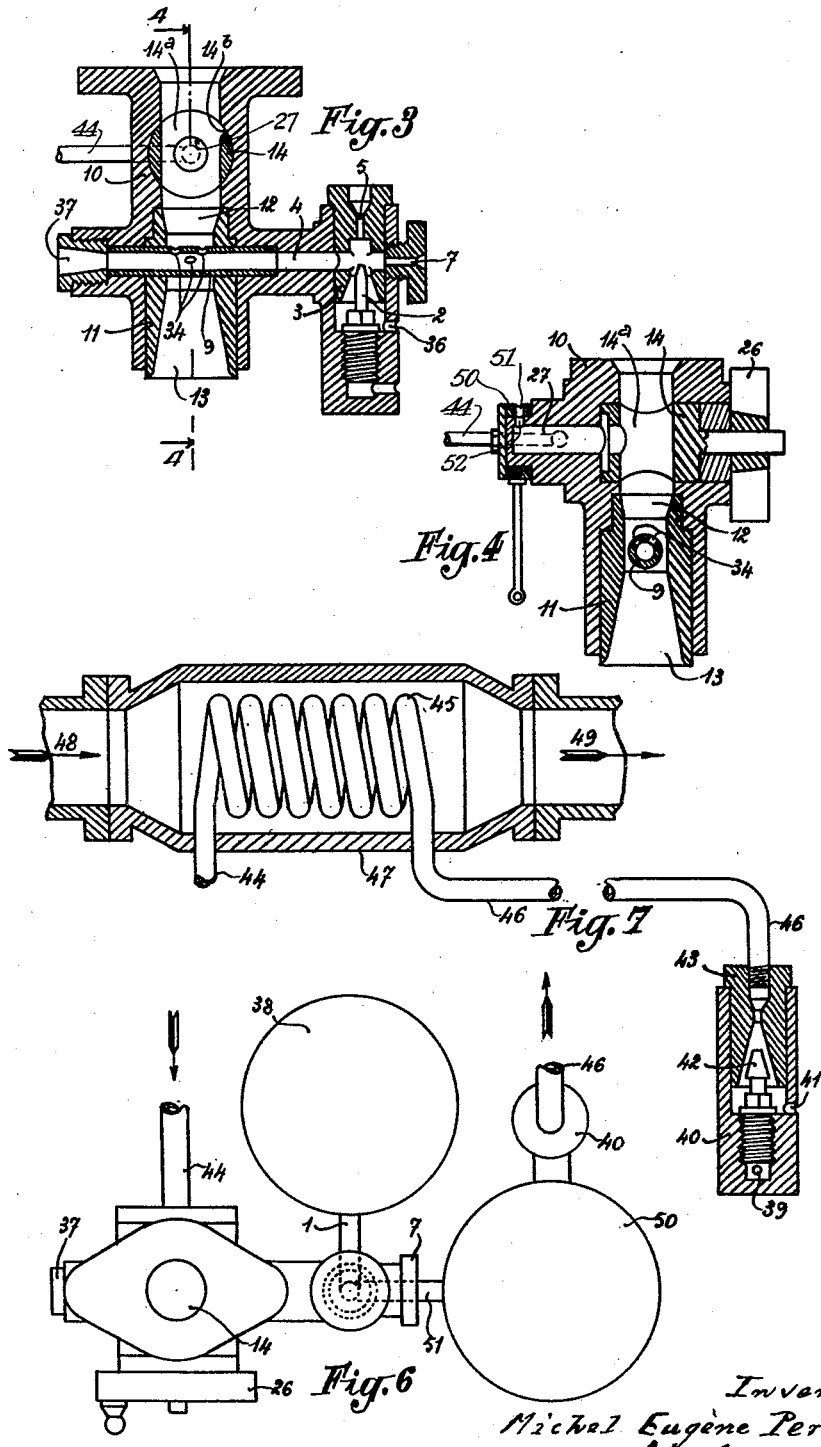

Patented Aug. 20, 1935

2,012,020

UNITED STATES PATENT OFFICE 2,012,020

CARBURETOR FOR INTERNAL COMBUSTION ENGINES

Michel Eugène Perrier, Roanne, France, assignor to "Les Carburateurs Défi", Roanne, (Loire) France, a joint-stock company of France Application August 18, 1932, Serial No. 629,375
In France August 20, 1931

8 Claims. (Cl. 261—18)

This invention relates to a carburetor of the kind adapted to feed an internal combustion engine with a mixture of two fluids, the first one or principal fluid being a liquid fuel atomized and mixed with air, and the second one, termed the auxiliary or explosive fluid, being a combustible gas or liquid capable of forming with air a readily ignitable and highly explosive mixture.

The aim of such carburetors is to permit of using for internal combustion engines provided with spark ignition liquid fuels otherwise not appropriate by themselves for a satisfactory operation, such as fuels of heavy character for instance.

The principal fluid, atomized and mixed with air, and the explosive fluid itself mixed with air, are subjected separately to the effect of the suction of the engine, and are induced in different variable proportions which depend both on the respective areas of the delivery apertures for the fluids and the position of the means for controlling their admission. The two fluids are brought into contact and are intimately mixed in the special apparatus before they are admitted to the cylinders of the engine, in which the explosive fluid is ignited by the usual ignition spark and then acts as a detonator in order to produce the explosion of the principal fluid.

The principal fluid forms the major part of the final mixture; it is intimately mixed with the explosive fluid after having been subjected to distinct and successive atomization, which improves the final atomization and consequently the tendency to explosion and the efficiency of the motor, and also permits of using liquid fuels of the most various kinds, thereby increasing the efficiency of ordinary fuels and making easy the use of liquid fuels which are otherwise unsuitable for use in engines of the kind in question.

In this way excellent results are obtained by using as a principal fluid petrol, benzol, alcohol, gas-oil, mazout, vegetable oils etc., or mixtures of these various fuels. The explosive fluid which forms the minor part of the final mixture is composed either of a gas such as hydrogen, acetylene, lighting gas and so forth, or by mixing a combustible liquid atomized and vaporized such as petrol, alcohol, benzol, ether, etc., or finally by mixing a liquid in finely atomized form, such as petrol, alcohol, benzol, ether etc., with air.

In this third case the liquid is subjected to distinct and successive atomization under the action of the suction of the motor, which acts in a relatively unvarying manner whatever the speed of the motor, and in this way permits the obtaining of a very fine and very regular atomization, always resulting in a very high explosive power and ready ignition.

The means for controlling the admission of the two fluids as an intimate mixture to the engine is such that it is the explosive fluid which is exclusively inspired for starting and slow running, and when the suction increases the principal fluid is induced and such induction takes place in increasing quantities, the ignition of which is ensured by the combuston of the explosive fluid.

The principal fluid and the explosive fluid are composed either of one and the same liquid or of different liquids. In the first case which applies to fuels in more or less ordinary use, such as petrol, benzol, and the like, the atomization is improved, more regular ignition is ensured and the efficiency is consequently very much increased.

The use of alcohol containing a more or less considerable proportion of water gives remarkable results, above all when it is mixed with a very small proportion of oil, (castor oil, colza or others), 1% for example, in order to lubricate the upper part of the cylinders and prevent the walls of the cylinders being attacked by the alcohol.

In the second case those liquid fuels, which are difficult to use in ordinary internal combustion engines, such as gas-oil, mazout, vegetable oils, whether mixed or not with other liquids, can be employed successfully and with a very attractive economic result;

(1) with an explosive fluid consisting of gases such as hydrogen acetylene, lighting gas, etc..

(2) with liquids converted into the state of vapor (petrol, benzol, alcohol, or other like carburation fuels)

(3) with liquids sprayed in air, such as petrol, benzol, alcohol.

In the carburetor according to this invention there is provided an admission of explosive fluid in the centre of a rotary plug forming throttle valve between the main diffuser and the engine manifold.

In the annexed drawings:—

In these two figures the controlling means are shown in the position corresponding to starting and running at low speeds.

Figure 1:
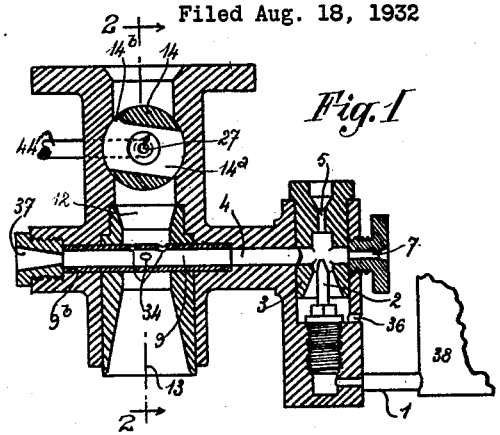
Fig. 1 is a vertical longitudinal section of the carbureter, showing the device for feeding the principal fluid.
Figure 3:
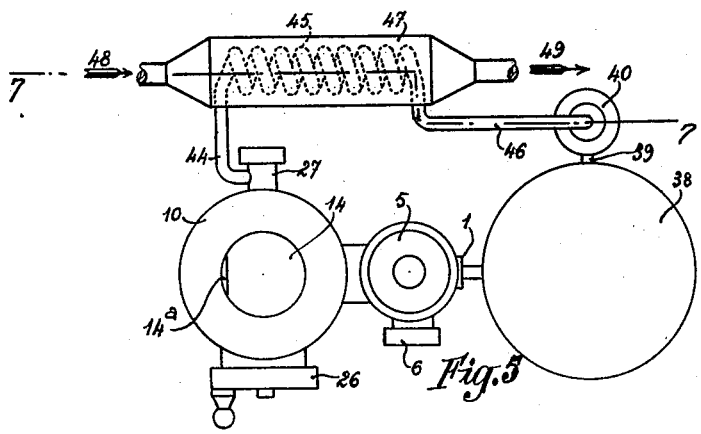

Fig. 3 is a section similar to Fig. 1 but the control parts are shown in the position corresponding to full throttle.

Fig. 4 is a section on line 4—4 of Fig. 3.

Fig. 5 shows an arrangement for the utilization of the liquid fuel which forms simultaneously the principal fluid and the explosive fluid.

Fig. 6 represents a device for utilization of two liquid fuels comprising the principal fluid, and the explosive fluid.

Fig. 7 is a section on line 7—7 of Fig. 5 drawn to an enlarged scale.

The upper part of the carburetor which is in direct communication with the cylinders of the motor is separated from the lower part 12, 13, by the rotary plug throttle valve 14, which on the one hand provides permanent communication with the explosive fluid which enters through the feed pipe 44 and on the other hand provides a variable communication with the lower part 12, 13 through which the principal fluid enters. The passage 14a of the valve 14 has a small cutaway part 14b, the position of which is such that in the closed position of the throttle valve (Fig' 1) this cut away part 14b, provides communication between the passage 14a and the upper part of the apparatus.

The fuel feed pipe 44 issues to a conduit 27 which terminates inside the passage 14a (Figs. 1 and 4).

The liquid fuel constituting the principal fluid is delivered to a float chamber 38 of the usual type, the fuel then passing by way of tube 1 to the jet 2 issuing to a bore 4 which is in communication with the atmosphere by the ports 5 and 37, and the apertures 5 and 36. This bore 4 issues to a tube 9, having apertures 34 which issue to the diffuser 12 above the conical air inlet 13.

Figure 2:
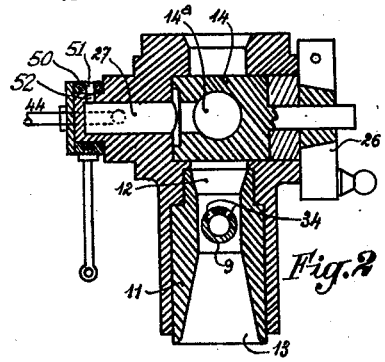
Fig. 2 is a section on line 2—2 of Fig. 1.

For starting and slow running the valve 14 is in the position shown in Figs. 1 and 2, in which the depression existing in the cylinders is transmitted by the cutaway part 14b to the passage 14a of the valve 14, but there is no depression in the lower part 12, 13 of the device below the valve. This depression therefore causes the fuel to be sucked into the cylinders by way of the aperture 27.

As soon as the driver accelerates by operating the throttle control lever 26 to move the valve 14 to the fully open position shown in Fig. 3 or any intermediate position, the suction in the cylinders is transmitted to the tube 9 through the ports 34, and thence to the jet 2 and at the same time air is drawn in through the annular space 3 and the opening 36, this air causing atomization of the fuel issuing from the jet 2. This mixture is subsequently supplemented by air entering through the ports 5, 7 and 37, this second mixture then passing through the apertures 34 and the diffuser 12 where it is atomized a second time by the air drawn in at 13. The new mixture thus obtained then passes through the bore 14a of the throttle valve and becomes intimately mixed with the explosive fluids emerging in jet form from the pipe 44 through the opening 27, this final mixture then passing into the cylinders of the engine.

Thus when the engine is running idle or at low loads, that is when the engine suction is low, it is fed only with the auxiliary explosive fluid. At high loads or speeds, that is when the suction is high, the engine is fed mainly with the principal fluid, the content of auxiliary explosive fluid in the final mixture being reduced. Thus a satisfactory operation is obtainable with heavy fuels which cannot be used at low loads. There is also provided a rotatable ported sleeve 50 having a hole 51 registrable with a hole 52 in the body surrounding the conduit 27, for the purpose of admitting additional air, particularly at high-engine speeds.

In the case of the principal fluid and the explosive fluid consisting of one and the same liquid the carburetor may be constructed as shown in Fig. 5. The float chamber 38 feeds, through a tube 39, a small carburetor 40, the details of which are shown in Fig. 7. The liquid passes through the hole 39 and the jet 42, on leaving which it is atomized by the air induced by suction through the opening 41 and through the annular space between the lower portion of passage 43 and jet 42.

The mixture of air and atomized liquid passes through the pipe 46 which is continued by a coil 45 arranged in a casing 47 interposed in the exhaust pipe, the exhaust gases entering at 48 and escaping at 49. The sprayed liquid mixed with air is vaporized and enters the main carburetor through the pipe 44.

If the sprayed liquid is not to be vaporized, the tube 46 is connected directly to the conduit 27 of the apparatus (Figs. 1 to 4); the atomized liquid passes into the passage 14a where the mixture is once more atomized by the mixture of air and liquid of the diffuser 12. The whole is then passed into the cylinders.

If the explosive fluids and the principal fluid are represented by two different liquids the carburetor is arranged according to Fig. 6; the float chamber 38 contains the principal liquid and the float chamber 50 having a small carburetor 40 up against it receives the other liquid, which after pulverization is vaporized by a heater similar to that of Fig. 7, or is passed direct into the passage 14a of valve 14, to be finally atomized again.

Generally in order to obtain good operation with a principal fuel difficult to ignite, it is an advantage to start and to continue running for a few moments using the explosive fluid in place of the principal liquid for this purpose when the motor is thoroughly hot the principal liquid is admitted and the other liquid passes exclusively through the small carburetor 40 in order to form the explosive fluid. This result is obtained by using a three way cock below the carburetor with jet 2, this cock being operated by the driver and putting the carburetor into communication either with the chamber 38 through pipe 1 or with the chamber 50 by the pipe 51 (Fig. 6).

On the other hand, the explosive liquid is always drawn in regularly whatever the speed of the motor, even when running slow. If there is a sudden acceleration, effected for instance by suddenly opening the throttle valve, the explosive fluid ensures the operation of the motor until such time as the depression has been able to overcome the inertia of the liquid constituting the principal fluid, which inertia is greater than that of the air drawn in at the same time.

What I claim as my invention and desire to secure by Letters Patent of the United States is:—

1. Apparatus for delivering combustible mixtures to internal combustion engine cylinders, said apparatus comprising means for producing a non-detonative fuel and air mixture, means for producing a detonative fuel and air mixture and adjustable means for varying the relative proportions of non-detonative and detonative mixture admitted to the cylinder, said last-named means comprising a throttle valve provided with a rotary plug having a flow passageway extending diametrically thereof for the flow of the non-detonative mixture and a duct extending axially thereof for providing communication between the flow passage and the means for producing the detonative fuel.

2. In apparatus for delivering combustible mixtures to the cylinders of internal combustion engines, means for producing a carburetted non-detonative mixture of air and a combustible liquid, means for producing a detonative mixture of air and a combustible fluid, and a common induction tract adapted to convey both detonative and non-detonative mixture to the engine cylinder, a throttle valve in said induction tract having a rotary plug, said plug having a passageway extending diametrically therethrough for the flow of the non-detonative mixture, and said plug also having a duct extending axially thereof for placing the diametrical passageway in communication with the means for producing the detonative mixture.

3. In a carburetor for internal combustion engines a liquid fuel metering jet and atomizing means associated therewith; a jet chamber; adapted to receive the atomized fuel from said jet; means for admitting air into admixture with the atomized fuel in said jet chamber; an air admitting choke tube; a mixture conveying duct from said jet chamber to said choke tube, said duct including provision for spraying mixture into the constricted part of said choke tube; a nozzle open at the end of said duct remote from the jet chamber to admit a counter-current of secondary air to the mixture flowing from the jet chamber into said choke tube through said duct; an induction tract extending from said choke tube an adjustable throttle in said induction tract to vary the flow of carburetted mixture from said choke tube from zero to a maximum; and means associated with said throttle for admitting a detonative fuel and air mixture through said tract to the engine cylinders irrespective of the adjustment of said throttle.

4. In apparatus for delivering combustible mixtures to internal combustion engines, a source of liquid main operating fuel, means for carburetting air with such main fuel, said carburetting means including an induction pipe and a variable rotary plug throttle valve therein, a source of secondary operating fuel, means for admixing air with such secondary fuel in detonative proportions and means for conveying the resulting detonative mixture through an axial duct in the rotary plug of the throttle valve into the induction pipe of the carburetting means.

5. Apparatus for delivering combustible mixtures to internal combustion engine cylinders, said apparatus comprising means for producing a non-detonative fuel and air mixture, means for producing a detonative fuel and air mixture and an adjustable rotary plug throttle valve for varying the relative proportions of non-detonative and detonative mixture admitted to the cylinder, the plug of said valve having an axial duct for conveying detonative mixture from the producing means to the cylinders said adjustable throttle valve being operative at low engine speed to cut off the supply of non-detonative fuel to the cylinder.

6. Apparatus for delivering combustible mixtures to internal combustion engine cylinders, said apparatus comprising means for producing a non-detonative fuel and air mixture, means for producing a detonative fuel and air mixture an adjustable rotary plug throttle valve for varying the relative proportions of non-detonative and detonative mixture admitted to the cylinder, said rotary plug having an axial duct for delivering the detonative mixture and being formed with means for substituting a supply of the detonative mixture for the normal supply of non-detonative mixture during the starting and initial running of the engine.

7. In apparatus for delivering combustible mixtures to internal combustion engines, a main carburetor, a secondary carburetor, a liquid fuel source common to both carburetors, said main carburetor adapted to deliver non-detonative combustible mixture to the engine and including in its delivery duct, a rotary plug throttle valve for varying the quantity of non-detonative mixture thus delivered and said secondary carburetor adapted to furnish a mixture having detonative characteristics, and a connection extending from the delivery duct of the secondary carburetor to the delivery duct of the main carburetor, said connection including means for vaporizing the fuel particles in the mixture in process of transfer from the secondary carburetor to the primary carburetor, and an axial duct in the rotary plug for introducing the detonative mixture into the non-detonative mixture.

8. A carburetor for internal combustion engines comprising means for producing a main air and fuel mixture; means for producing an auxiliary air and fuel mixture; and a throttle valve comprising a rotary plug having a flow passageway extending diametrically thereof for the flow of said main mixture, said rotary plug having a duct extending axially thereof for providing communication between the flow passage and said second-named producing means, and said plug also having a cut-away portion of said passageway for the flow of said auxiliary mixture from said passageway when the flow of said main mixture is wholly cut-off by said plug.

MICHEL EUGÈNE PERRIER.